(12) United States Patent
Hattori et al.

(10) Patent No.: US 9,783,869 B2
(45) Date of Patent: Oct. 10, 2017

(54) HYDROMETALLURGICAL PROCESS FOR NICKEL OXIDE ORE

(71) Applicant: Sumitomo Metal Mining Co., Ltd., Tokyo (JP)

(72) Inventors: Yasumasa Hattori, Niihama (JP); Yasumasa Kan, Tokyo (JP); Hidetoshi Watanabe, Tokyo (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 59 days.

(21) Appl. No.: 14/436,970

(22) PCT Filed: Feb. 12, 2013

(86) PCT No.: PCT/JP2013/053206
§ 371 (c)(1),
(2) Date: Apr. 20, 2015

(87) PCT Pub. No.: WO2014/125558
PCT Pub. Date: Aug. 21, 2014

(65) Prior Publication Data
US 2015/0284820 A1 Oct. 8, 2015

(51) Int. Cl.
C22B 23/00 (2006.01)
C22B 3/00 (2006.01)
(Continued)

(52) U.S. Cl.
CPC ............. C22B 23/043 (2013.01); C22B 3/08 (2013.01); C22B 3/22 (2013.01); C22B 3/44 (2013.01);
(Continued)

(58) Field of Classification Search
CPC ..... C22B 23/043; C22B 23/0461; C22B 3/08; C22B 3/44; C22B 3/22
(Continued)

(56) References Cited

U.S. PATENT DOCUMENTS

| 4,548,794 A | 10/1985 | Lowenhaupt et al. |
| 7,871,584 B2 | 1/2011 | Liu et al. |
| 2006/0228279 A1* | 10/2006 | Campbell ............... C01G 9/08 423/150.1 |

FOREIGN PATENT DOCUMENTS

| CA | 2678724 A1 * | 3/2010 |
| CN | 101638730 A | 2/2010 |

(Continued)

OTHER PUBLICATIONS

Canadian Patent Appl. No. 2879600—Office Action issued Apr. 23, 2015.

(Continued)

*Primary Examiner* — Steven Bos
(74) *Attorney, Agent, or Firm* — Gerald E. Hespos; Michael J. Porco; Matthew T. Hespos (57) ABSTRACT

Provided is a hydrometallurgical process of recovering Ni from nickel oxide ore using a high pressure acid leaching, in which abrasion of the facilities caused by an ore slurry is suppressed, the amount of a final neutralized residue is reduced, and impurity components are separated and recovered for recycling. The hydrometallurgical process includes, as steps of the high pressure acid leaching, at least one step selected from step (A): separating and recovering chromite particles in the ore slurry; step (B-1): through leaching step and a solid-liquid separation step, performing neutralization of a leachate obtained after the solid-liquid separation step using a Mg-based alkali such as $Mg(OH)_2$; and step (B-2): through leaching step and a solid-liquid separation step, performing neutralization of a leachate obtained after the solid-liquid separation step using a Mg-based alkali such as $Mg(OH)_2$, and then recovering hematite particles.

20 Claims, 2 Drawing Sheets (51) Int. Cl.
   *C22B 3/08*   (2006.01)
   *C22B 3/22*   (2006.01)
   *C22B 3/44*   (2006.01)
(52) U.S. Cl.
   CPC ........ *C22B 23/005* (2013.01); *C22B 23/0415* (2013.01); *C22B 23/0461* (2013.01); *Y02P 10/212* (2015.11)
(58) Field of Classification Search
   USPC ..................................... 423/53, 150.1, 101
   See application file for complete search history.

(56)                References Cited

FOREIGN PATENT DOCUMENTS

| JP | 4-276033    | 10/1992 |
| JP | 6-116660    | 4/1994  |
| JP | 2005-350766 | 12/2005 |
| JP | 2007077459  | 3/2007  |
| JP | 2010-95788  | 4/2010  |
| JP | 2012-107289 | 6/2012  |

OTHER PUBLICATIONS

Australian Patent Appl. No. 2013378469—Office Action issued Jun. 19, 2015.
Rama Murthy, Y., et al., "New Prospective for the Utilisation of Indian Lateritic Chromite Overburden", Proceedings of the XI International Seminar on Mineral Processing Technology (MPT-2010), vol. 1, Section 3, 2010.
Office Action Dated Dec. 7, 2015.
International Search Report of May 8, 2013.

\* cited by examiner

HYDROMETALLURGICAL PROCESS FOR NICKEL OXIDE ORE

BACKGROUND

1. Field of the Invention

The present invention relates to a hydrometallurgical process for nickel oxide ore.

More particularly, the present invention relates to a hydrometallurgical process for nickel oxide ore of recovering nickel and cobalt from nickel oxide ore by a high pressure acid leaching that included an ore processing step, a leaching step, a solid-liquid separation step, a neutralization step, a zinc removal step, a sulfurization step and a final neutralization step; and which hydrometallurgical process can achieve the tasks of suppressing the abrasion of facilities such as piping and pumps caused by the ore slurry produced from the ore processing step, increasing durability, reducing the amount of a final neutralized residue produced from the final neutralization step, and suppressing the cost and environmental risks by compressing the volume of the tailing dam that stores the leaching residue that will be disposed of, neutralized precipitate, and the like, and also enables separation and recovery of impurity components that can be effectively utilized by recycling.

2. Description of the Related Art

In recent years, as a result of further progress in oligopolization of the rights to mining for mineral resources such as coal, iron, copper, nickel, cobalt, chromium, and manganese, the raw material cost for metal smelting is increasing to a large extent. Therefore, even for metal smelting, development of technologies for using low grade raw materials that have not been hitherto taken into consideration because it is disadvantageous in terms of cost, is underway as a measure for cost reduction.

For example, in regard to nickel smelting, materials having excellent corrosion resistance at a high temperature and a high pressure have been developed. Thus, attention has been paid to a hydrometallurgical process based on a high pressure acid leaching of subjecting nickel oxide ore to acid leaching with sulfuric acid under pressure.

The high pressure acid leaching does not include dry processes such as a reduction process and a drying process, unlike a pyrometallurgical method which is a conventional common smelting method for nickel oxide ore, and is advantageous in terms of energy and cost. Therefore, the high pressure acid leaching will be continuously considered as a promising technology as a smelting method for low grade nickel oxide ore. Accordingly, in order to increase the level of performance as a smelting process, various suggestions have been made mainly on the leaching process at a high temperature under pressure, in connection with an increase in the leaching ratios of nickel and cobalt, solution purification of the leachate, a decrease in the amount of use of the operation materials, and the like.

Meanwhile, regarding a process of utilizing leaching at a high temperature under pressure, for example, there has been suggested a method of recovering valuable metals, such as nickel, cobalt and manganese, from oxide ores containing these metals, the method including the following steps (a) to (c) (see, for example, JP 06-116660 A (Page 1 and Page 2)).

Step (a): Oxide ore that has been slurrified in advance is subjected to leaching at normal pressure under sulfuric acid condition, using a pressurized acid leachate obtained in a step (b) as shown below, and a normal-pressure leachate and a normal-pressure leach residue are obtained.

Step (b): The normal-pressure leach residue obtained in the step (a) is allowed to react with sulfuric acid in an oxidizing atmosphere at a high temperature and a high pressure, and thus a pressurized acid leachate is obtained.

Step (c): A neutralizing agent is added to the normal-pressure leachate obtained in the step (a) to neutralize the leachate, subsequently a sulfurized alkali compound is added thereto, and nickel and cobalt in the leachate are recovered as sulfides.

In this method, the leach rate of nickel from ore is increased by performing two-stage leaching of subjecting an ore slurry to normal-pressure leaching (step (a)), and then the normal-pressure leach residue is subjected to acid leaching under pressure (step (b)). At the same time, the excess acid contained in the leachate of pressurized acid leaching is neutralized by the alkali component contained in the normal-pressure leach residue, and the burden of the neutralization step (step (c)) is reduced.

However, due to the two-stage leaching, there is a problem that the number of facility items increases so that more cost and efforts are needed, and it requires expenses to treat a large amount of a thin solution generated at the time of washing the leach residue.

Thus, in order to solve these problems, there has been suggested a method including the steps (1) to (4) as shown below, as another process of utilizing leaching at a high temperature under pressure (see, for example, JP 2005-350766 A (Page 1 and Page 2)).

(1) Leaching step: Nickel oxide ore is prepared into slurry, sulfuric acid is added thereto, the mixture is stirred at a temperature of 220° C. to 280° C., and thus a leached slurry is formed.

(2) Solid-liquid separation step: The leached slurry obtained in the previous leaching step is washed using multi-stage thickeners, and the leached slurry is separated into a leachate containing nickel and cobalt, and a leach residue.

(3) Neutralization step: The pH of the leachate obtained in the solid-liquid separation step is adjusted to 4 or less using calcium carbonate while suppressing oxidation of the leachate, a neutralized precipitate containing trivalent iron is produced, and the neutralized precipitate is separated into a neutralized precipitate slurry and a mother liquor for nickel recovery.

(4) Sulfurization step: Hydrogen sulfide gas is blown into the mother liquor for nickel recovery obtained in the sulfurization step, sulfides containing nickel and cobalt are produced, and the sulfides are separated from a barren liquor.

Here, an outline of a practical plant based on the technology disclosed in JP 2005-350766 A (Page 1 and Page 2) will be described with reference to the drawings.

Figure 2:
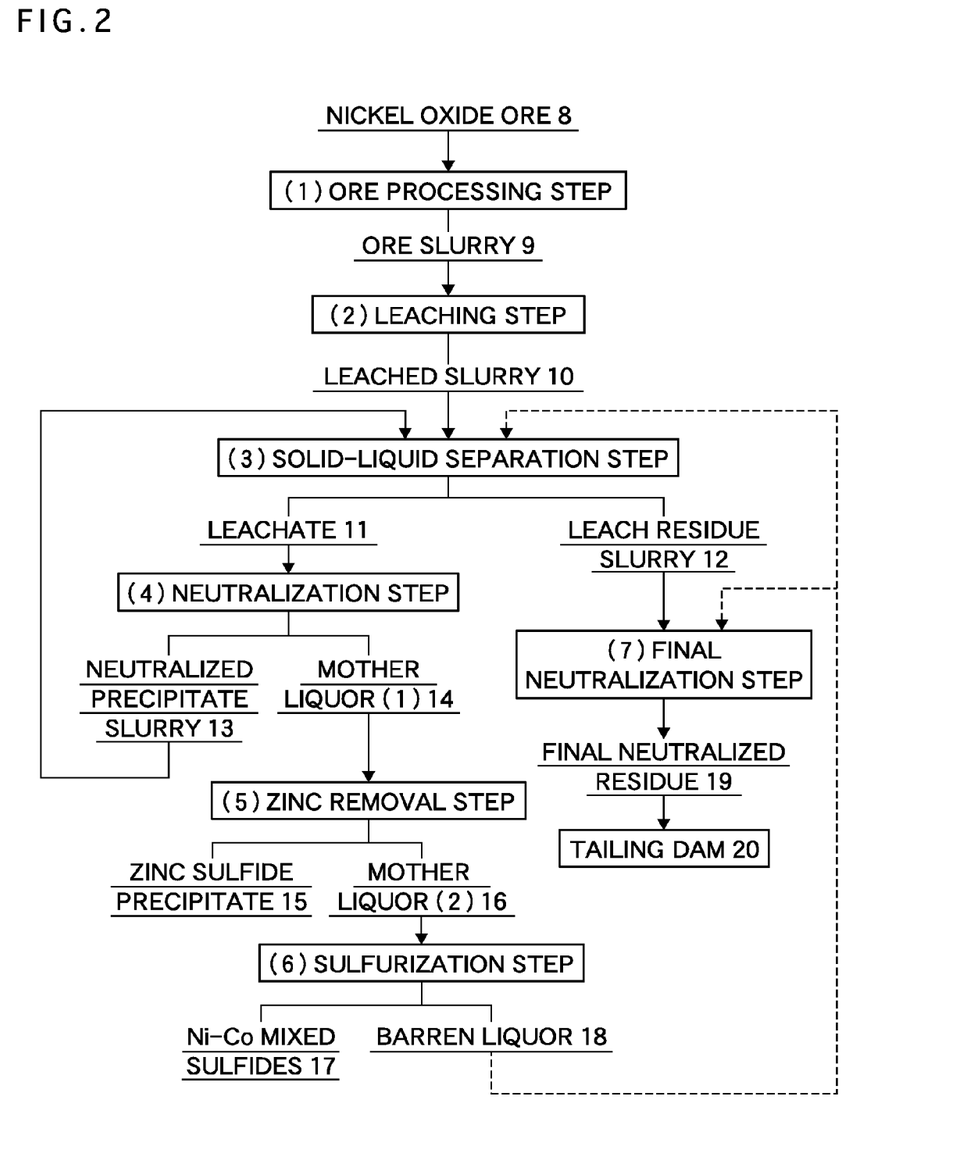
FIG. 2 is a smelting process diagram illustrating an exemplary practical plant based on a conventional hydrometallurgical process for nickel oxide ore (Patent Document 2).

FIG. 2 is a smelting process diagram illustrating an exemplary practical plant based on the hydrometallurgical process for nickel oxide ore (JP 2005-350766 A (Page 1 and Page 2)).

In FIG. 2, nickel oxide ore 8 is first mixed with water in (1) ore processing step, subsequently the removal of foreign materials and the adjustment of ore particle size are carried out, and an ore slurry 9 is formed.

Next, the ore slurry 9 is subjected to high-temperature pressure leaching using sulfuric acid in (2) leaching step, and thus a leached slurry 10 is formed.

The leached slurry 10 thus formed is subjected to (3) solid-liquid separation step to be washed in multiple stages, and then the leached slurry is separated into a leachate 11 containing nickel and cobalt, and a leach residue slurry 12.

The leachate 11 is subjected to (4) neutralization step, and is separated into a neutralized precipitate slurry 13 containing trivalent iron hydroxide, and a mother liquor (1) for nickel recovery 14.

The mother liquor (1) 14 is subjected to (5) zinc removal step of adding a sulfurizing agent, and the mother liquor is separated into a zinc sulfide precipitate 15 containing zinc sulfide, and a mother liquor (2) 16 for nickel recovery.

Next, the mother liquor (2) 16 is subjected to (6) sulfurization step, and is separated into a mixed sulfide 17 containing nickel and cobalt, and a barren liquor 18 having nickel and the like removed therefrom. The barren liquor 18 is used as washing water for the leach residue in (3) solid-liquid separation step.

Finally, the leach residue slurry 12 is subjected to (7) final neutralization step together with an excess amount of the barren liquor 18, and the leach residue slurry is neutralized. A final neutralized residue 19 is stored in a tailing dam 20.

A feature of this method lies in that by washing the leached slurry in multiple stages in the solid-liquid separation step, the amount of neutralizing agent consumption and the amount of precipitate in the neutralization step can be reduced; since the true density of the leach residue can be increased, the solid-liquid separation characteristics can be improved; and the process is simplified by performing the leaching step simply by high-temperature pressure leaching. Thus, this method is considered to be advantageous against the method suggested in JP 06-116660.

Furthermore, it is believed that when such a barren liquor is used as the washing liquid used in the solid-liquid separation step, nickel adhering to the leach residue can be leached and recovered using residual sulfuric acid, and repeated use of water can be carried out effectively and efficiently.

Furthermore, when the neutralized precipitate slurry is sent to the solid-liquid separation step, the loss of nickel can be reduced, and therefore, it is believed to be more advantageous.

However, a practical plant adopting this method has the following problems.

(1) Suppression of Abrasion of Facilities

Although nickel oxide ore is conveyed in the form of slurry between various processes, abrasion of the facility materials is markedly accelerated so that there occurs a high frequency of maintenance particularly in facilities such as piping and pumps in the leaching step, and this high frequency serves as a major factor for an increase in the maintenance cost and a decrease in the rate of plant operation.

(2) Reduction of Amount of Final Neutralized Residue

The leach residue obtained in the solid-liquid separation step is combined with excess barren liquor produced from the sulfurization step, and the mixture is made harmless by a neutralization treatment of adding a limestone slurry or a slaked lime slurry thereto.

The final neutralized residue produced from this final neutralization treatment step (hereinafter, may be referred to as final neutralization step) is stored in the tailing dam. However, the final neutralized residue contains, in addition to impurity components such as hematite and chromite in the leach residue, gypsum that is formed by the neutralization treatment so that the final neutralized residue cannot be recycled, and there is a heavy burden of expenses for the construction and maintenance management of the tailing dam.

Under such circumstances, there has been a demand for a solution for the problems described above with regard to the practical plant using a hydrometallurgical process based on the high pressure acid leaching.

Furthermore, in order to solve the problems in an effective and economically efficient manner, it is an effective measure to efficiently separate and recover impurity components that are contained in the ore or leach residue, and it is also demanded to recycle and effectively utilize these impurity components.

Thus, the applicant of the present application has suggested in JP 2010-95788 A a hydrometallurgical process for nickel oxide ore, which includes a step of physically separating and recovering particles containing at least one selected from silica mineral, chromite or silica-magnesia mineral from ore slurry, and a step of physically separating and recovering hematite particles in the leach residue slurry, in a hydrometallurgical process based on a high pressure acid leaching. However, further improvements have been needed for efficient separation and recovery of impurity components contained in ore or leach residue, and recycling of these impurity components that have been separated and recovered.

Under such circumstances, the present invention was achieved in view of the problems of the conventional technologies, and it is an object of the present invention to provide a hydrometallurgical process for nickel oxide ore of recovering nickel and cobalt from nickel oxide ore by a high-pressure acid leaching that includes an ore processing step, a leaching step, a solid-liquid separation step, a neutralization step, a zinc removal step, a sulfurization step, and a final neutralization step; and which hydrometallurgical process can achieve the tasks of suppressing the abrasion of facilities such as piping and pumps caused by the ore slurry produced from the ore processing step, increasing durability, increasing the solid content ratio of the ore slurry, simplifying the facilities of the ore processing step, reducing the amount of a final neutralized residue produced from the final neutralization step, and suppressing the cost and environmental risks by compressing the volume of the tailing dam that stores the leaching residue that will be disposed of, neutralized precipitate, and the like, and also enables separation and recovery of impurity components that can be effectively utilized by recycling.

SUMMARY OF THE INVENTION

In order to achieve the object described above, the inventors of the present invention conducted extensive investigations on the solution for the problems described above, in connection with a hydrometallurgical process for recovering nickel and cobalt from nickel oxide ore by a high pressure acid leaching that includes an ore processing step, a leaching step, a solid-liquid separation step, a neutralization step, a zinc removal step, a sulfurization step, and a final neutralization step. As a result, the inventors carried out at least one step selected from step (A) of separating and recovering, by a particular method, particles containing chromite in an ore slurry produced from an ore processing step; and step (B) of performing, after the step (A), and after a leaching step and a solid-liquid separation step, neutralization by a particular method that does not produce gypsum, and recovering the metals, and the inventors found that this method is effective as a solution for the problem described above, thus completing the present invention.

According to a first aspect of the present invention, there is provided a hydrometallurgical process for nickel oxide ore of recovering nickel and cobalt from nickel oxide ore using a high pressure acid leaching that includes an ore processing step, a leaching step, a solid-liquid separation step, a neutralization step, a zinc removal step, a sulfurization step, and a final neutralization step, the hydrometallurgical process including at least one step selected from the following step (A), step (B-1), and step (B-2):

Step (A): a step of separating and recovering chromite particles in an ore slurry produced from the ore processing step, by a recovery process including a specific gravity separation;

Step (B-1): a step of neutralizing a leachate produced by subjecting the ore slurry that has the chromium-level lowered through the step (A), to the leaching step and the solid-liquid separation step, while the neutralization is carried out using a magnesium-based neutralizing agent; and Step (B-2): a step of neutralizing a leach residue slurry produced by subjecting the ore slurry that has the chromium-level lowered through the step (A), to the leaching step and the solid-liquid separation step, while the neutralization is carried out using a magnesium-based neutralizing agent, and hematite particles are then recovered.

The present invention further relates to a hydrometallurgical process for nickel oxide ore of recovering nickel and cobalt from nickel oxide ore using a high pressure acid leaching that includes an ore processing step, a leaching step, a solid-liquid separation step, a neutralization step, a zinc removal step, a sulfurization step, and a final neutralization step, the method including the step (A), step (B-1), and step (B-2) described above.

The recovery process of the step (A) may include subjecting the ore slurry to cyclone classification using a cyclone, reducing fine iron hydroxide particles, and then recovering chromite particles in the ore slurry from the ore slurry as a concentrate of chromite using a specific gravity separation.

The recovery process of the step (A) may involve performing of cyclone classification without diluting the slurry concentration of the ore slurry.

The recovery process of the step (A) further may involve collecting of chromite into an underflow in the cyclone classification in the entire amount except for unavoidable losses.

The specific gravity separation may include at least one step selected using a floatex density separator, using a spiral concentrator, and using a shaking table.

The pulp content of the slurry supplied to the spiral concentrator may be 15% to 35% solid, and preferably 20% to 30% solid.

The amount of Teeter Water supplied to the floatex density separator may be 0.5 to 7.0 [m3·h−1/m2].

After the specific gravity separation, the slurry is subjected to physical separation based on magnetic separation to remove magnetite, and non-magnetized materials are then recovered as a chromite concentrate.

The ore processing step may include performing the removal of foreign materials in the mined raw material ore and the adjustment of the ore particle size, and forming an ore slurry. The leaching step may include adding sulfuric acid to the ore slurry, stirring the mixture at a high temperature and a high pressure, and forming a leached slurry formed from a leach residue and a leachate. The solid-liquid separation step may include washing the leached slurry in multiple stages, and obtaining a leachate containing nickel and cobalt, and a leach residue slurry. The neutralization step may include adding an alkali to the leachate, and forming a neutralized precipitate slurry containing trivalent iron, and a mother liquor for nickel recovery. The zinc removal step may include blowing in hydrogen sulfide gas into the mother liquor, and forming a zinc sulfide precipitate slurry and a mother liquor for nickel and cobalt recovery. The sulfurization step may include blowing in hydrogen sulfide into the mother liquor for nickel and cobalt recovery, and producing a mixed sulfide containing nickel and cobalt, and a barren liquor. The final neutralization step may include adding excess barren liquor to the leach residue slurry, adjusting the pH to about 8 to 9, and obtaining a final neutralized residue.

The adjustment of the ore particle size in the ore processing step is carried out by a screening treatment to a particle size of 2 mm or less.

A level of chromium(III) oxide in the concentrated chromite may be 45% or more.

A thirteenth aspect of the present invention is the hydrometallurgical process for nickel oxide ore according to the first to twelfth aspects, in which in the step (B-2), the pH after neutralization is adjusted to 4 to 7, and thereafter, final neutralization is carried out using an alkali other than a magnesium-based neutralizing agent.

In the step (B-2), the leach residue slurry or the neutralized residue slurry including the leach residue slurry is subjected to cyclone classification, and at that time, a fine particle portion thus classified is recovered as a concentrate of hematite.

According to the hydrometallurgical process for nickel oxide ore of the present invention, when step (A) and step (B) are adopted in a hydrometallurgical process of recovering nickel and cobalt from nickel oxide ore by a high pressure acid leaching that includes an ore processing step, a leaching step, a solid-liquid separation step, a neutralization step, a zinc removal step, a sulfurization step, and a final neutralization step, the problems described above are solved as follows. Therefore, the industrial value of the hydrometallurgical process is enormous.

When the step (A) is adopted, particles containing chromite in the ore slurry produced from the ore processing step are separated and recovered, so that abrasion of facilities such as piping and pumps at the time of transportation of the ore slurry can be suppressed.

Furthermore, since chromite is separated before wet smelting, reduction of the amount of leach residue can be expected, and the amount of a final neutralized residue can be reduced. Furthermore, if the chromite thus separated can be concentrated, the concentrated chromite can also be effectively utilized as a resource.

Furthermore, when the step (B) is adopted, since hematite in the leach residue produced from the solid-liquid separation step is separated and recovered, reduction of the amount of a final neutralized residue produced from the final neutralization step can be promoted, the cost and environmental risks caused by compression of the volume of the tailing dam that stores the leach residue that will be disposed of, a neutralized precipitate, and the like, can be suppressed, and also, the hematite that has been separated and recovered can be effectively utilized as a resource for iron.

DETAILED DESCRIPTION OF EMBODIMENT

The hydrometallurgical process for nickel oxide ore of the present invention is a hydrometallurgical process of recovering nickel and cobalt from nickel oxide ore by a high pressure acid leaching that includes an ore processing step, a leaching step, a solid-liquid separation step, a neutralization step, a sulfurization step, a zinc removal step, a sulfurization step, and a final neutralization step, the hydrometallurgical process including at least one step selected from the following step (A), step (B-1), and step (B-2).

[Steps]

Step (A)

This is a step of separating and recovering chromite particles in the ore slurry produced from the ore processing step, by a recovery process including a specific gravity separation.

Step (B-1)

This is a step of subjecting the ore slurry having its Cr-level lowered through the step (A), to a leaching step and a solid-liquid separation step, and performing neutralization of the leachate obtained after the solid-liquid separation step using a Mg-based neutralizing agent such as $Mg(OH)_2$ or MgO.

Step (B-2)

This is a step of subjecting the ore slurry having its Cr-level lowered through the step (A), to a leaching step and a solid-liquid separation step, performing neutralization of the leach residue slurry obtained after the solid-liquid separation step using a Mg-based neutralizing agent such as $Mg(OH)_2$ or MgO, and recovering hematite particles.

It is important for the method of the present invention to include at least one step selected from the step (A), step (B-1), and step (B-2), in view of solving the problems.

Adoption of the step (A) is intended to suppress the abrasion of facilities such as piping and pumps at the time of transportation of the ore slurry, by separating and recovering particles containing chromite in the ore slurry produced from the previous ore processing step.

That is, abrasion is suppressed by separating chromite that is generally contained in nickel oxide ore and has a very high hardness value.

Furthermore, by eliminating in advance chromite from the ore slurry before wet smelting, reduction of the amount of leach residue is expected, and the amount of a final neutralized residue may be reduced. Furthermore, if the chromite that has been separated and recovered can be sufficiently concentrated, the chromite can also be effectively utilized as a resource.

On the other hand, since adoption of step (B) enables separation and recovery of hematite in the leach residue produced from the solid-liquid separation step, the amount of the final neutralized residue produced from the final neutralization step is reduced, and the expenses and environmental risks caused by compression of the volume of the tailing dam for storing the leach residue to be disposed of, a neutralized precipitate and the like, can be suppressed. At the same time, the hematite thus separated and recovered can also be effectively utilized as a resource for iron.

This, that is to say, iron in the nickel oxide ore, is hydrolyzed at a high temperature in the leaching step, and therefore, iron is contained in the form of hematite in the final neutralized residue. However, since the final neutralized residue contains gypsum that is formed by a neutralization treatment using a neutralizing agent containing Ca, in addition to chromite in the leach residue, the iron-level is as low as 30% to 40% by mass, and it is not feasible to effectively utilize the final neutralized residue directly as a raw material for iron making or the like.

It is because sulfur (gypsum; calcium sulfate), chromium (chromite) and the like that are contained in the final neutralized residue are components that affect the distribution of trace components in pig iron, the quality of steel products, and the like, and it is desirable to suppress any inclusion of these impurity elements.

On the contrary, in the present invention, since neutralization is achieved using a Mg-based neutralizing agent, $MgSO4$ having high solubility is produced, and since less sulfur is fixed to solids, a hematite having a low sulfur-level can be separated and recovered.

Next, an outline of the hydrometallurgical process for nickel oxide ore of the present invention will be described with reference to FIG. 1.

Figure 1:
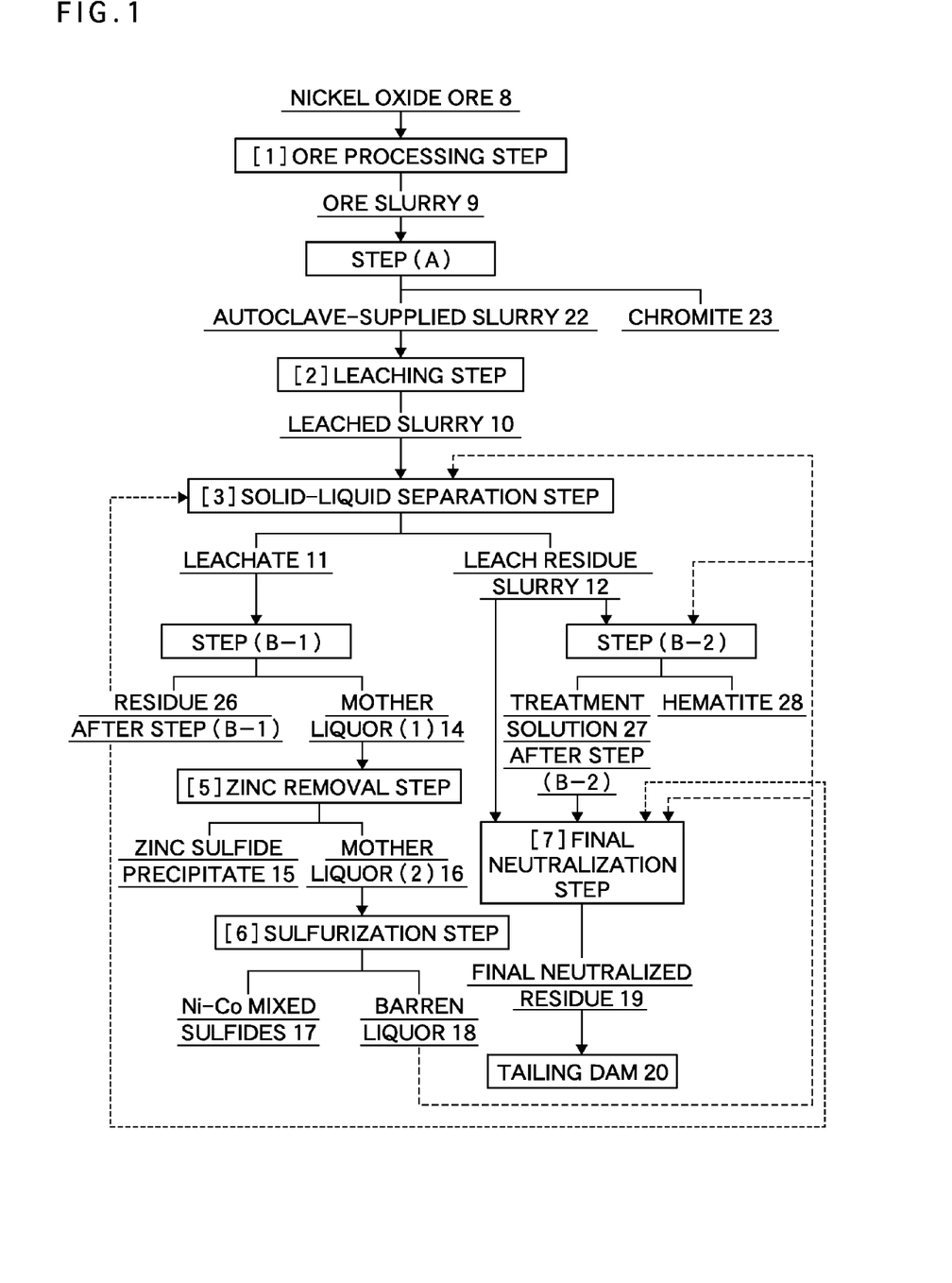
FIG. 1 is a smelting process diagram illustrating an exemplary embodiment according to a hydrometallurgical process for nickel oxide ore related to the present invention.

FIG. 1 is a smelting process diagram illustrating an exemplary embodiment according to the hydrometallurgical process for nickel oxide ore related to the present invention.

As illustrated in FIG. 1, first, nickel oxide ore 8 is mixed with water in [1] ore processing step, and then the removal of foreign materials and the adjustment of the ore particle size are carried out to form an ore slurry 9.

Thereafter, the ore slurry 9 is subjected to step (A), which is newly provided, to separate and recover chromite 23. An autoclave-supplied slurry 22 on one side is supplied to [2] leaching step.

Here, the autoclave-supplied slurry 22 is converted to a leached slurry 10 by leaching valuable components such as nickel and cobalt with sulfuric acid using an autoclave or the like.

The leached slurry 10 thus formed is supplied to [3] solid-liquid separation step that uses multi-stage thickeners or the like, and is separated into a leachate 11 containing nickel and cobalt, and a leach residue slurry 12.

Subsequently, the leachate 11 is supplied to the step (B-1), and is separated into a residue 26 after the step (B-1) containing trivalent iron hydroxide as a main component, and a mother liquor (1) 14 containing nickel.

The mother liquor (1) 14 is subjected to [5] zinc removal step in which a sulfurizing agent is added, and is then separated into a zinc sulfide precipitate 15 containing zinc sulfide, and a mother liquor (2) 16 for nickel recovery.

Subsequently, the mother liquor (2) 16 is subjected to [6] sulfurization step in which a sulfurizing agent is added, and is separated into a mixed sulfide 17 containing nickel and cobalt, and a barren liquor 18.

Meanwhile, the barren liquor 18 may be used as washing water for the leach residue in the [3] solid-liquid separation step, and the barren liquor 18 may also be supplied to the final neutralization step.

Finally, a portion of the leach residue slurry 12 is supplied to the step (B-2) together with an excess amount of the barren liquor 18, and is subjected to neutralization. Thus, hematite 28 is separated and recovered therefrom.

At that time, a treatment solution 27 after the step (B-2), and the other portion of the leach residue slurry 12 that was not supplied to the step (B-2) are supplied to [7] final neutralization step, and the leach residue slurry is neutralized to about pH 8 to 9.

The final neutralized residue 19 thus obtained is stored in the tailing dam 20.

Hereinafter, the various steps will be described in more detail.

[1] Ore Processing Step and Step (A)

The ore processing step is a step of forming an ore slurry by performing the removal of foreign materials and the adjustment of the ore particle size.

In this step, nickel oxide ore is classified using a wet sieve or the like to separate any foreign material that cannot be leached in a leaching step, ore particles having a particle size that is difficult to be transported by a pump, and the like.

Usually, the screened particle size is about 2 mm, and ore particles having particle sizes greater than that are subjected to a pulverization treatment.

A slurry is formed by the ore that has undergone pulverization-screening treatment, and then the slurry is settled and concentrated, so that an autoclave-supplied slurry having an adjusted solid concentration in the slurry (hereinafter, referred to as slurry concentration) is prepared. In this regard, it is usually desirable to adjust the slurry concentration to about 30% to 45% by mass.

The nickel oxide ore that serves as the raw material to be treated by the hydrometallurgical process of the present invention, is composed mainly of so-called lateritic ore, such as limonite and saprolite.

The nickel content of this lateritic ore is usually 0.8% to 2.5% by mass, and nickel is contained in the form of hydroxide or hydrous silica-magnesia (magnesium silicate) mineral.

Further, the content of iron is 10% to 50% by mass, and iron is mainly in the form of trivalent hydroxide (goethite); however, some divalent iron is contained in hydrous silica-magnesia mineral or the like. Silicic acid components are contained in silica mineral such as cristobalite (amorphous silica), and hydrous silica-magnesia mineral.

In addition, a major part of chromium components are contained as chromite mineral containing iron or magnesium. Furthermore, magnesia components are contained in silica-magnesia mineral that almost do not contain nickel, which is unweathered and has a high hardness value, in addition to the hydrous silica-magnesia mineral.

As described above, silica mineral, chromite mineral, and silica-magnesia mineral are so-called gangue components that almost do not contain nickel, in regard to lateritic ore.

That is, in the ore slurry produced from the ore processing step, in general, chromite that largely affects the abrasion of facilities such as piping and pumps for the leaching step is included.

Therefore, it is preferable to have chromite separated and recovered in advance for the ore processing step, from the ore slurry produced in the ore processing step.

Here, the distribution state of various components in the ore particles that constitute the ore slurry will be explained.

In an EPMA observation of nickel oxide ore, a major portion of the chromium content has a high proportion of chromium existing as a single phase independent of a major portion of the iron content, and there are many particles having a particle size of 20 μm to 1000 μm.

This indicates that minerals including chromium are contained in large amounts in particles having a particle size of about 20 μm or more, and minerals including nickel and iron are contained in large amounts in particles having a particle size of about 20 μm or less.

Therefore, in order to effectively separate and recover chromite from the ore slurry, it is essential to set up an appropriate classification particle size by slurrifying the ore obtained after eliminating coarse particles, and crushing nickel oxide ore in this ore slurry so as to have an appropriate particle size.

The crushed particle size at this time can be determined in consideration of the original purpose of forming the ore slurry; however, the crushed particle size is preferably about 2 mm or less.

Table 1 shows an example of the ore particle size distribution of the ore slurry obtained by crushing the ore to a particle size of about 2 mm or less, and the grades of various components at various particle size scales.

From Table 1, it is understood that chromium, silicon, magnesium and the like are concentrated in the coarse particle portion having a particle size of 75 μm or more. On the other hand, it is understood that iron is concentrated in the fine particle portion having a particle size of 75 μm or less.

TABLE 1

| Particle size [μm] | Partition ratio [mass %] | Chemical composition [mass %] | | | |
|---|---|---|---|---|---|
| | | Fe | Cr | Si | Mg |
| −2000 + 1400 | 0.9 | 36 | 2 | 14 | 6 |
| +850 | 1.8 | 37 | 3 | 13 | 6 |
| +355 | 2.7 | 33 | 3 | 12 | 5 |
| +75 | 5.3 | 42 | 5 | 9 | 3 |
| −75 | 89.3 | 47 | 3 | 6 | 2 |
| Average | 100 | 45.7 | 2.7 | 6.6 | 2 |

Next, step (A) is a step of separating and recovering chromite in the ore slurry produced from the ore processing step. It is also possible to separate and remove mineral particles of silica mineral, silica-magnesia, or the like as process intermediates.

Also, the step (A) may be carried out as a process included in the ore processing step, or may be carried out subsequently to the ore processing step.

The method for step (A) is not particularly limited, and methods using various physical separation means that separate chromite from the ore slurry can be applied. However, among these, in view of the analysis of the distribution state of various components in the ore particles that constitute the ore slurry, in order to concentrate chromite, for example, up to 45 mass % $Cr_2O_3$, which can be easily recycled, after separating and recovering chromite, wet physical separation methods including a specific gravity separation is essential.

That is, as shown in Table 1, there are limitations on the level that can be concentrated by classification, and not only the classification but also separation utilizing specific gravity is needed.

The classification particle size in this classification may be any particle size as long as the goethite containing nickel of the fine particle portion can be efficiently separated, and it is preferable that the classification particle size be selected preferably in the range of 20 μm to 150 μm, and more preferably in the range of 45 μm to 75 μm.

That is, the lower limit of the classification point that can be industrially implemented is 20 μm in most cases, and if this classification particle size is less than 20 μm, concentration of chromite in the coarse particle portion is insufficiently achieved, and also, nickel in the ore slurry used in the leaching step is lost. On the other hand, if the classification particle size is more than 150 μm, removal of silica mineral, chromite, and silica-magnesia in the fine particle portion is insufficiently achieved.

Furthermore, the technique for this classification is not particularly limited, but it is desirable to select cyclone classification that is capable of processing of large quantities with high performance.

Generally, the specific gravity of chromite is known to be larger than that of iron hydroxide such as goethite, and thus, coarse chromite having a large specific gravity and fine goethite having a small specific gravity can be separated efficiently by a cyclone.

The operation pressure of the cyclone is desirably 0.1 MPa to 0.3 MPa when the separation performance and the processing speed are taken into consideration.

Regarding the shape of the cyclone, it is desirable to adjust the shape such that the pulp content of the underflow would be 50 wt % or more.

Furthermore, there are no particular limitations on the pulp content of the ore slurry supplied to the cyclone, but the pulp content is preferably 10 wt % to 30 wt %, and more preferably 15 wt % to 20 wt %.

Separation using a cyclone can be achieved even at a pulp content of 10 wt % or less; however, a large amount of water is needed, and it is also disadvantageous in precipitate concentration in the subsequent steps. Also, if the pulp content is more than 30 wt %, the viscosity of the slurry increases, and separation may become difficult.

That is, when the pulp content after the ore processing step is set to 10 wt % to 30 wt % of the range described above, it is not necessary to supply water afresh, and a tank for dilution is also not necessary, which is preferable.

As discussed above, when the pulp content, the cyclone operation pressure, and the cyclone shape are optimized, distribution of chromite to the overflow can be mostly eliminated, and it is preferable from the viewpoint of chromite recovery.

After goethite that contains nickel is separated and removed as much as possible by the classification using a cyclone, chromite is further concentrated using a specific gravity separation apparatus.

The specific gravity separation apparatus used is not particularly limited; however, it is preferable to select at least one of a shaking table, a floatex density separator and a spiral concentrator, and it is more preferable to select at least one of a floatex density separator and a spiral concentrator, which are adequate for processing of large quantities.

Meanwhile, in the case of using a spiral concentrator, the pulp content of the slurry supplied to this is preferably more than 15 wt % but less than 35 wt %, and more preferably more than 20 wt % but less than 30 wt %.

If the pulp content is 15 wt % or less, the separation performance may be deteriorated, and if the pulp content is 35 wt % or more, the flow of particles on the chromite concentration side (inner side) is retained during the separation with a spiral concentrator, and build-up occurs, so that separation may not be achieved sufficiently.

In the case of employing a floatex density separator, it is desirable to set the amount of teeter water to 0.5 to 7.0 [m3·h−1/m2].

If the amount of teeter water is less than 0.5, the effect of hindered settling is small, and specific gravity separation is not carried out efficiently.

On the other hand, if the amount of teeter water is larger than 7.0, even chromite particles are cause to rise up, and a loss may occur on the overflow side. In this case, the amount of chromite in the slurry supplied to the leaching step increases, and it becomes disadvantageous from the viewpoints of chromite recovery as well as lowering of the Cr-level in hematite.

Furthermore, simply by this specific gravity separation, concentration can be achieved to obtain a Cr2O3-level in chromite of 45 wt % to 48 wt % or more; however, in order to achieve further concentration, it is desirable to separate and remove magnetite that is contained in a trace amount.

Since the specific gravity of magnetite is very close to the specific gravity of chromite, magnetic separation is utilized.

On the occasion of magnetic separation, the magnetic field strength is not particularly limited, and may vary depending on the belt speed, belt thickness, or other apparatuses; however, the magnetic field strength is preferably in the range of 200 [Oe] to 2000 [Oe].

If the magnetic field strength is less than 200 [Oe], the magnetic field is so weak that separation and elimination of magnetite may be achieved insufficiently. On the other hand, if the magnetic field strength is more than 2000 [Oe], there is no problem with the removal of magnetite, but there are occasions in which even chromite is magnetized.

Particularly preferably, it is desirable to use a low-magnetic field magnetic concentrator.

[2] Leaching Step

The leaching step is a step of forming a leached slurry composed of a leach residue and a leachate, by adding sulfuric acid to the ore slurry obtained through the ore processing step and step (A), and then stirring the mixture at a temperature of 220° C. to 280° C. In this step, a preheater, an autoclave, and a flash tank are used as main facilities.

In regard to this leaching step, leaching of nickel, cobalt and the like as sulfates, and fixation of the leached iron sulfate as hematite are achieved by a leaching reaction represented by the following reaction formulae (1) to (3), and a high temperature thermal hydrolysis reaction represented by reaction formulae (4) and (5).

However, since fixation of iron ions does not proceed to completion, the liquid portion of the leached slurry thus obtainable usually contains divalent and trivalent iron ions in addition to nickel, cobalt and the like.

[Chemical Formula 1]
[Leaching Reaction]

$$MO + H_2SO_4 \Rightarrow MSO_4 + H_2O \qquad (1)$$

(wherein M represents Ni, Co, Fe, Zn, Cu, Mg, Cr, Mn or the like)

$$2Fe(OH)_3 + 3H_2SO_4 \Rightarrow Fe_2(SO_4)_3 + 6H_2O \qquad (2)$$

$$FeO + H_2SO_4 \Rightarrow FeSO_4 + H_2O \qquad (3)$$

[Chemical Formula 2]
[High Temperature Thermal Hydrolysis Reaction]

$$2FeSO_4 + H_2SO_4 \Rightarrow + \tfrac{1}{2}O_2 \Rightarrow Fe_2(SO_4)_3 + H_2O \qquad (4)$$

$$Fe_2(SO_4)_3 + 3H_2O \Rightarrow Fe_2O_3 + 3H_2SO_4 \qquad (5)$$

The reaction temperature for the leaching step is 220° C. to 280° C., and preferably 240° C. to 270° C.

That is, when the reactions are carried out in this temperature range, iron is fixed as hematite.

If the reaction temperature is lower than 220° C., since the rate of the high temperature thermal hydrolysis reaction is slow, iron remains dissolved in the reaction solution. Therefore, the solution purification load for removing iron is increased, and it may be very difficult to separate iron from nickel. On the other hand, if the temperature exceeds 280° C., the high temperature thermal hydrolysis reaction itself is accelerated; however, it is difficult to select the material for the vessel used in high-temperature pressure leaching, and the cost for steam applied to the temperature rise is increased, which is therefore inappropriate.

The amount of use of sulfuric acid used in the leaching step is not particularly limited, and an amount slightly excessive compared to the stoichiometric amount required for the iron in the ore to be leached and converted to hematite, for example, 300 kg to 400 kg per ton of the ore, is used. Particularly, if the amount of addition of sulfuric acid per ton of the ore is more than 400 kg, the cost for sulfuric acid and the cost for the neutralizing agent in the subsequent steps are increased, which is not preferable. Furthermore, regarding the amount of use of sulfuric acid in view of the leaching step product, the concentration of free sulfuric acid at the time of completion of leaching is aimed to be 25 g/L to 50 g/L, and preferably, an amount of use of sulfuric acid of 35 g/L to 45 g/L is used.

When the above-described conditions are satisfied, the true density of the leach residue is increased, a high density leach residue is stably produced, and the solid-liquid separability of the slurry is increased. Therefore, simplification of the facilities of the solid-liquid separation step, which is the subsequent step, can be achieved.

That is, if the concentration is less than 25 g/L, when the slurry including the leaching residue is settled, precipitate concentration of the solid components is achieved incompletely, and floating solid components remain in the supernatant. This is because the rate of the high temperature thermal hydrolysis reaction is slow, dehydration of iron hydroxide does not proceed sufficiently, and hematite having a low true density is formed.

On the other hand, if the concentration is more than 50 g/L, it is necessary to enhance durability of the leaching facilities, and since the amount of use of the neutralizing agent required for the neutralization of acid is markedly increased, it is disadvantageous in view of cost.

[3] Solid-Liquid Separation Step

The solid-liquid separation step is a step of washing in multiple stages the leached slurry formed in the previous leaching step, and obtaining a leachate containing nickel and cobalt, and a leach residue. Thereby, nickel and the like that adhere to the leach residue and are disposed of are recovered into the leachate.

[4] Neutralization Step [Step (B-1) and Step (B-2)]
(4-1) Neutralization Step 1 [Treatment of Leachate]
Step (B-1)

This step (B-1) is a step in which a neutralizing agent (pH adjusting agent) is added to adjust the pH to 4 or less, and preferably to the range of 3.2 to 3.8, while oxidation of a leachate 11 obtained in the leaching step is suppressed by neutralizing the leachate 11 that has been separated in the previous solid-liquid separation step, and a residue 26 after the step (B-1) as a neutralized precipitate slurry containing trivalent iron, and a mother liquor (1) 14 for nickel recovery are formed.

When this step is used, neutralization of the excess acid used in the leaching step is carried out, and also, removal of trivalent iron ions remaining in the leachate is carried out.

That is, if the pH exceeds 4, generation of nickel hydroxide is increased.

When a neutralizing agent containing Ca, such as $CaCO_3$, is used, gypsum is produced; however, since the residue 26 after the step (B-1) of the neutralized precipitate slurry generated in this step is such that a portion is returned to the solid-liquid separation step and repeatedly used, incorporation of gypsum into the leach residue slurry occurs.

Thus, a Mg-based alkali such as $Mg(OH)_2$, which does not contain Ca, or a Mg-based neutralizing agent such as MgO, which dissolves in the leachate and thereby exhibits alkalinity, is used as the neutralizing agent.

[5] Zinc Removal Step

This zinc removal step is a step in which, prior to the step of separating nickel and cobalt as sulfides, hydrogen sulfide gas is blown into the mother liquor obtained in the previous step, sulfides containing zinc are produced, and a zinc sulfide precipitate slurry and a mother liquor for nickel and cobalt recovery are formed.

This is to selectively remove zinc by suppressing the rate of a sulfurization reaction by generating mild conditions at the time of the sulfurization reaction, and suppressing co-precipitation of nickel that co-exists at a higher concentration compared with zinc.

This zinc sulfide precipitate slurry thus obtained can be sent to the final neutralization step (7) and treated, similarly to the neutralized precipitate slurry obtainable in the neutralization step.

[6] Sulfurization Step

This sulfurization step is a step of blowing hydrogen sulfide into the mother liquor (2) for nickel and cobalt recovery obtained in the zinc removal step, and producing a mixed sulfide 17 containing nickel and cobalt, and a barren liquor 18.

Here, the barren liquor 18 thus obtained is at a pH of about 1 to 3, and contains impurities such as iron, magnesium and manganese that are contained without being sulfurized, as well as slight amounts of nickel and cobalt as a recovery loss. Therefore, the barren liquor 18 is used as washing water for the leach residue in the solid-liquid separation step, and as the washing water for the neutralized residue produced in the neutralization step.

(4-2) Neutralization Step 2 [Treatment of Leach Residue Slurry]
Step (B-2)

This step (B-2) is a step of neutralizing a portion of the leach residue (leach residue slurry 12) produced in the solid-liquid separation step, using a Mg-based alkali such as $Mg(OH)_2$ or a Mg-based neutralizing agent such as MgO, and recovering hematite particles.

The method for step (B-2) is not particularly limited, but a Ca-based alkali is not used as the neutralizing agent. For example, when $CaCO_3$ is used as the neutralizing agent, this compound reacts with adhering sulfuric acid, and gypsum is produced. Since this gypsum has low solubility, gypsum is precipitated as a solid and increases the sulfur level in the residue. On the other hand, since $MgSO_4$ has high solubility, this compound is not easily precipitated as a solid, and is effective for the decrease of sulfur.

Therefore, the neutralizing agent is preferably $Mg(OH)_2$, which is a Mg-based alkali; however, a Mg-based neutralizing agent such as $MgO_2$ may be used.

Here, the analysis of the distribution state of various components in the ore particles that constitute the leach residue slurry 12 will be described.

First, Table 2 shows an example of the ore particle size distribution of the leach residue obtained by leaching the ore slurry obtained by crushing the ore to a particle size of about 2 mm or less, and the levels of various components at various particle size scales.

TABLE 2

| Particle size | Partition ratio | Chemical composition [mass %] | | | |
|---|---|---|---|---|---|
| [μm] | [mass %] | Fe | Cr | Si | Mg |
| −2000 + 1400 | 0 | — | — | — | — |
| +850 | 0 | — | — | — | — |
| +355 | 0.1 | 28 | 2 | 24 | 0 |
| +75 | 0.7 | 26 | 7 | 25 | 1 |
| −75 | 99.1 | 45 | 2 | 8 | 1 |
| Average | 100 | 44.6 | 2.5 | 7.8 | 1 |

From Table 2, it can be seen that iron is concentrated in the fine particle portion having a particle size of 75 μm or less, and silicon is separated in this portion. Meanwhile, the analysis of the leach residue was carried out by removing any adhering sulfuric acid by washing the leach residue slurry with water.

From the results described above, by utilizing the fact that particles containing iron at a high content are finer particles than those particles containing chromium, silicon and the like at high contents, the particles containing iron can be separated from the coarse particle portion containing chromium, silicon and the like at high contents, by means of screening means such as a classification method, and driven away out of the system, and hematite can be recovered as a resource.

The classification method is preferably a treatment using a cyclone or the like, which is capable of processing of large quantities.

[7] Final Neutralization Step

This final neutralization step is a step of precipitating metal ions in the liquid as neutralized precipitate and obtaining a final neutralized residue 19, by adding a treatment solution 27 after the step (B-2), which liquid is obtained in the step (B-2), the portion of the slurry that has not been treated in the step (B-2) in the leach residue slurry 12 obtained after the solid-liquid separation step, and the residue 26 after the step (B-1), or optionally, a product obtained by slurrifying the zinc sulfide precipitate 15 obtainable in the zinc removal step; further adding a limestone slurry and a slaked lime slurry; and adjusting the pH to about 8 or 9. Meanwhile, the final neutralized residue 19 thus obtained is stored in the tailing dam 20.

EXAMPLES

Hereinafter, the present invention will be further described by way of Examples, but the present invention is not intended to be limited to these Examples.

In the Examples, analyses are carried out using a fluorescent X-ray analysis method or an ICP emission analysis method for the analysis of metals.

Example 1

Classification of an ore slurry having a composition as indicated in Table 3 was carried out using a hydrocyclone (manufactured by Daiki Ataka Engineering Co., Ltd., Model MD-9) as the classification apparatus used in the step (A).

In Example 1, classification was carried out under the conditions of a slurry concentration of 15% by mass, a slurry temperature at normal temperature, and an operation pressure of 0.2 MPa.

The ore slurry composition and the underflow composition of the hydrocyclone are presented together in Table 3. Meanwhile, the unit of the following table is percent (%) by mass.

TABLE 3

|  | $Cr_2O_3$ | $SiO_2$ | Fe | Ni |
|---|---|---|---|---|
| Ore slurry | 2.9 | 4.1 | 50.8 | 1.2 |
| HC-UF | 8.1 | 5.5 | 45.8 | 1.0 |

HC-UF: Underflow of hydrocyclone

As can be seen from Table 3, in the coarse particle portion (underflow) obtainable by the hydrocyclone, the level of $Cr_2O_3$ increased to 8.1% by mass relative to 2.9% by mass in the supplied ore, and the level of $SiO_2$ increased to 5.5% by mass relative to 4.1% by mass in the supplied ore; however, the level of Fe decreased to 45.8% by mass relative to the iron level 50.8% by mass in the supplied ore.

From the above, it is understood that silica mineral and chromite are concentrated and separated in the coarse particle portion by classification of the ore slurry.

Next, the underflow (slurry concentration: 33% by mass) of the hydrocyclone was supplied to a FLOATEX (trademark) density separator (manufactured by Outotec, Inc., "TANKSIZER TS-LAB", inner diameter of tank: 228.6 mm).

The supply rate was set to 56.7 [kg/Hr], and the slurry temperature was set to normal temperature.

The process was carried out by setting the amount of teeter water at this time to 5.5 [m3·h−1/m2], and the set point (set value of the densitometer) to 21.

The compositions of the feed of the floatex density separator (underflow of the hydrocyclone) and the under flow of the floatex density separator are presented in Table 4.

TABLE 4

|  | $Cr_2O_3$ | $SiO_2$ | Fe | Ni |
|---|---|---|---|---|
| HC-UF | 8.1 | 5.5 | 45.8 | 1.0 |
| FDS-UF | 16.8 | 6.4 | 37.8 | 1.1 |

HC-UF: Underflow of hydrocyclone
FDS-UF: Underflow of floatex density separator

As can be seen from Table 4, in the coarse particle portion (FDS-UF) obtainable by the floatex density separator, the level of $Cr_2O_3$ increased to 16.8% by mass relative to 8.1% by mass at the time of cyclone classification (HC-UF), and the level of $SiO_2$ increased to 6.4% by mass relative to 5.5% by mass; however, the level of iron decreased to 37.8% by mass relative to 45.8% by mass.

From the above results, it is understood that silica mineral and chromite are concentrated and separated in the coarse particle portion by the floatex density separator treatment.

The underflow of the floatex density separator (FDS-UF: slurry concentration: 50% by mass) was diluted with water to adjust the slurry concentration to 25% by mass, and the diluted slurry was subjected to a table test of treating the underflow in a shaking table (manufactured by Outotec, Inc., "WILFLEY (trademark) concentrating table 13A").

The amount of water supplied was set to 7.57 [liters/min].

The results of the table test are presented in Table 5. Here, the symbol "-" in the table indicates the case of being non-measurable.

TABLE 5

|  | $Cr_2O_3$ | $SiO_2$ | Fe | Ni |
|---|---|---|---|---|
| FDS-UF | 16.8 | 6.4 | 37.8 | 1.1 |
| Concentrate | 43.7 | 9.8 | 26.2 | — |
| Middling | 15.9 | 5.4 | 38.7 | — |
| Tailing | 1.3 | 15.2 | 36.8 | 1.6 |
| Slimes | 1.7 | 6.1 | 46.9 | 1.2 |

FDS-UF: Underflow of floatex density separator

As can be seen from Table 5, in the "Concentrate" obtainable by the shaking table, the level of $Cr_2O_3$ increased to 43.7% by mass relative to 16.8% by mass in the supplied ore. On the other hand, the level of $Cr_2O_3$ was 15.9% by mass in the Middling, 1.3% by mass in the Tailing, and 1.7% by mass in the Slimes.

From these results, it is understood that chromite is separated by the shaking table treatment.

The "Concentrate" obtained in the table test was screened with a 30-mesh sieve, and then what had passed through the sieve was supplied to a low-magnetic field magnetic concentrator (manufactured by Outotec, Inc., "MOS(10) 111-15"). Thus, a magnetized material (Mag) and a non-magnetized material (Non-mag) were obtained.

The results are presented in Table 6. Here, the symbol "—" in the table indicates the case of being non-measurable.

TABLE 6

|  | $Cr_2O_3$ | $SiO_2$ | Fe | Ni |
|---|---|---|---|---|
| Concentrate | 43.7 | 9.8 | 26.2 | — |
| +30 mesh | 31 | 8.7 | 25.5 | 0.46 |
| −30 mesh | — | — | — | — |
| Magnetic concentrator feed |  |  |  |  |
| Mag | 29.7 | 0.75 | 37.8 | 0.25 |
| Non-mag | 48.1 | 0.65 | 20.8 | 0.16 |

As can be seen from Table 6, the level of $Cr_2O_3$ (non-magnetized material/Non-mag) obtainable by low-magnetic field magnetic concentration was increased to 48.1% by mass relative to 43.7% by mass in the supplied ore. On the other hand, the level of Fe decreased to 20.8% by mass from 26.2% by mass.

On the contrary, the Fe-level of $Cr_2O_3$ (magnetized material/Mag) was 37.8% by mass, and also from the fact that the Fe-level was high, it can be seen that magnetite was separated and removed by magnetic concentration, and the $Cr_2O_3$-level of chromite increased.

From the above results, it can be said that in the smelting method of the present invention described in Example 1, concentration can be achieved to a concentration that surpasses the $Cr_2O_3$-level of a chromite commonly available in the market.

Example 2

Classification of the ore slurry described in Table 7 was carried out using a hydrocyclone (manufactured by Daiki Ataka Engineering Co., Ltd., Model MD-9) as a classification apparatus. Here, the slurry concentration was adjusted to 15% by mass, the temperature of the slurry was set to normal temperature, and the operation pressure was set to 0.2 MPa.

The compositions of the ore and the underflow of the hydrocyclone are presented in Table 7.

TABLE 7

|  | $Cr_2O_3$ | $SiO_2$ | Fe | Ni |
|---|---|---|---|---|
| Ore slurry | 3.4 | 4.4 | 51.5 | 1.1 |
| HC-UF | 9.2 | 6.0 | 45.2 | 1.0 |
| HC-OF | 1.8 | 4.5 | 53.7 | 1.2 |

HC-UF: Underflow of hydrocyclone
HC-OF: Overflow of hydrocyclone

As can be seen from Table 7, in the coarse particle portion (HC-UF) obtainable by the hydrocyclone, the $Cr_2O_3$-level increased to 9.2% by mass relative to 3.4% by mass in the supplied ore, and the $SiO_2$-level increased to 6.0% by mass relative to 4.4% by mass in the supplied ore; however, the iron-level decreased to 45.2% by mass relative to the iron-level of 51.5% by mass in the supplied ore.

From the above results, it is understood that silica mineral and chromite are concentrated and separated in the coarse particle portion by classification of the ore slurry.

Next, the underflow of the hydrocyclone (HC-UF: slurry concentration: 33% by mass) was supplied to a floatex density separator (manufactured by Outotec, Inc., "TANK-SIZER TS-LAB"). The supply rate was set to 56.7 [kg/Hr], and the temperature of the slurry was set to normal temperature.

The amount of teeter water at this time was set to 6.9 $[m^3 \cdot h^{-1}/m^2]$, and the Set Point (set value of the densitometer) was set to 20.

The compositions of the feed of the floatex density separator (supplied ore/inserted material: HC-UF), the underflow (FDS-UF), and the overflow (FDS-OF) are presented in Table 8.

TABLE 8

|  | $Cr_2O_3$ | $SiO_2$ | Fe | Ni |
|---|---|---|---|---|
| HC-UF | 9.2 | 6.0 | 45.2 | 1.0 |
| FDS-UF | 35.0 | 4.0 | 25.7 | 0.35 |
| FDS-OF | 3.1 | 3.9 | 50.0 | 1.1 |

HC-UF: Underflow of hydrocyclone
FDS-UF: Underflow of FLOATEX
FDS-OF: Overflow of FLOATEX As can be seen from Table 8, in the coarse particle portion (FDS-UF) obtainable by the floatex density separator, the $Cr_2O_3$-level increased to 35.0% by mass relative to 9.2% by mass in the supplied ore; however, on the other hand, the iron-level decreased to 25.7% by mass relative to 45.2% by mass in the supplied ore.

From the above results, it is understood that chromite is concentrated and separated in the coarse particle portion by the floatex density separator treatment.

The underflow of the floatex density separator (FDS-UF: slurry concentration: 50% by mass) was diluted with water to obtain a slurry concentration of 25% by mass, and the underflow was subjected to a spiral test by treating the underflow using a spiral concentrator (manufactured by Outotec, Inc., "MC7000").

The results of the spiral test are presented in Table 9.

TABLE 9

|  | $Cr_2O_3$ | $SiO_2$ | Fe | Ni |
|---|---|---|---|---|
| FDS-UF | 35.0 | 4.0 | 25.7 | 0.35 |
| Concentrate | 48.8 | 0.4 | 21.3 | 0.13 |
| Middling | 45.0 | 0.8 | 22.5 | 0.17 |
| Tailing | 14.1 | 16.8 | 25.0 | 0.73 |
| Slimes | 9.4 | 6.4 | 40.5 | 0.94 |

FDS-UF: Underflow of FLOATEX

As can be seen from Table 9, in the "Concentrate" obtainable by the spiral concentrator, the $Cr_2O_3$-level increased to 48.8% by mass relative to 35.0% by mass in the supplied ore.

On the other hand, the $Cr_2O_3$-level was 45.0% by mass in the "Middling", 14.1% by mass in the "Tailing", and 9.4% by mass in the "Slimes".

From the above results, it is understood that chromite is concentrated and separated by a spiral concentrator treatment.

The "Concentrate" obtained by this spiral test was diluted to a slurry concentration of 20%, and the dilution was supplied to a low-magnetic field magnetic concentrator (manufactured by Outotec, Inc., "INPROSYS BENCHTOP LIMS") at a supply rate of 45.4 [kg/Hr]. Thus, a magnetized material (Mag) and a non-magnetized material (Non-mag) were obtained.

The results are presented in Table 10.

TABLE 10

|  | $Cr_2O_3$ | $SiO_2$ | Fe | Ni |
|---|---|---|---|---|
| Concentrate | 48.8 | 0.4 | 21.3 | 0.13 |
| Mag | 30.5 | 0.7 | 37.8 | 0.18 |
| Non-mag | 50.0 | 0.4 | 19.5 | 0.07 |

As can be seen from Table 10, the $Cr_2O_3$-level obtainable by the low-magnetic field magnetic concentration (non-magnetized material/Non-mag) increased to 50.0% by mass relative to 48.8% by mass in the supplied ore. On the other hand, the Fe-level decreased to 19.5% by mass from 21.3% by mass.

Regarding the $Cr_2O_3$-level (magnetized material/Mag), also from the fact that the Fe-level was as high as 37.8% by mass, it can be seen that magnetite was separated and removed by magnetic concentration, and the $Cr_2O_3$-level of chromite increased.

This means that concentration can be achieved to a concentration that surpasses the $Cr_2O_3$-level of a chromite commonly available in the market.

Comparative Example 1

Classification of the ore slurry was carried out using a hydrocyclone (manufactured by Daiki Ataka Engineering Co., Ltd., "Model MD-9") as the classification apparatus.

Here, classification was carried out under the conditions of a slurry concentration of 9.8% by mass, a slurry temperature at normal temperature, and an operation pressure of 0.22 MPa.

The underflow of the hydrocyclone (slurry concentration: 33% by mass) was diluted to a slurry concentration of 4.9% by mass, and the dilution was charged into a high-mesh separator (manufactured by Kikosha Co., Ltd., "KUC-612S").

The supply rate to the high-mesh separator was 0.98 [$m^3$/hour], the speed of rotation of the bucket was 0.8 rpm, the bucket length was 75 mm, and the bucket had holes having a diameter of 4 mm opened at a pitch of 6 mm, while the ratio of hole area was 40%.

The amount of washing water was set to 6 $m^3$/hour.

The compositions of the ore and the underflow of the hydrocyclone, and the composition of the underflow of the high-mesh separator are presented in Table 11.

TABLE 11

|  | $Cr_2O_3$ | Ni |
|---|---|---|
| Ore slurry | 4.1 | 1.1 |
| HC-UF | 13.0 | 0.8 |
| HMS-UF | 19.1 | 0.5 |

HC-UF: Underflow of hydrocyclone
HMS-UF: Underflow of high-mesh separator

As is obvious from Table 11, concentration was achieved from the $Cr_2O_3$-level of the ore slurry of 4.1% to 13.0% in the coarse particle portion of the hydrocyclone (HC-UF), and to 19.1% in the coarse particle portion of the high-mesh separator (HMS-UF); however, the intended composition level of commercially available products was not achieved.

In this process, there was no problem in the concentration using a hydrocyclone in particular; however, it can be judged that concentration with a high-mesh separator is unsatisfactory.

Thus, the following investigation was carried out to find the cause.

Each of the underflows (HC-UF and HMS-UF) was screened with a 75-μm sieve, and was subjected to the following analysis. The results presented in Table 12 were obtained.

TABLE 12

|  | Size [μm] | Composition [wt %] | Level Cr | Level Fe | Level Ni | Total level Cr | Total level $Cr_2O_3$ |
|---|---|---|---|---|---|---|---|
| HC-UF | +75 | 43 | 16.7 | 36.0 | 0.5 | 8.9 | 13.0 |
|  | −75 | 57 | 3.0 | 50.6 | 1.0 |  |  |
| HMS-UF | +75 | 85 | 14.2 | 38.1 | 0.5 | 13.1 | 19.1 |
|  | −75 | 15 | 6.7 | 49.8 | 0.7 |  |  |

HC-UF: Underflow of hydrocyclone
HMS-UF: Underflow of high-mesh separator

In Table 12, it was found that the Cr-level of the underflow of the high-mesh separator was 14.2% (20.7% $Cr_2O_3$), which was lower than 16.7% (24.4% $Cr_2O_3$) of the underflow of the hydrocyclone, and specific gravity separation was not at all achieved.

From these results, the high-mesh separator performed only the operation of slime removal, and did not perform the operation of specific gravity separation.

As such, it can be seen that a chromite having a $Cr_2O_3$-level equivalent to the level of commercially available products could not be concentrated any further, unless specific gravity separation was carried out.

Example 3

The overflow of the hydrocyclone and the overflow of the floatex density separator of Example 2 were introduced into an autoclave at a ratio of 77:15 by solid weight, 98% sulfuric acid was added to this mixture, and the mixture was subjected to high temperature pressurized sulfuric acid leaching under the following conditions. Thus, a leached slurry 10 was produced.

Furthermore, the leached slurry thus produced was separated into a leachate 11 and a leach residue slurry 12 by a solid-liquid separation step.

[Leaching Conditions]
Leaching temperature: 245° C.
Leaching time: 60 minutes
Final free sulfuric acid concentration (at the time of completion of leaching): 40 [g/L]
Slurry concentration: 30% by weight
Autoclave volume: 5 L Next, in order to find the $Cr_2O_3$-level in the leach residue slurry 12, a $Mg(OH)_2$ slurry as a neutralizing agent at a concentration of 20% by mass was added to the leach residue slurry 12, and the leach residue slurry was neutralized at 70° C. to obtain a pH of 2.5.

Subsequently, this slurry was subjected to solid-liquid separation using a 5C filter paper. A $Mg(OH)_2$ slurry was further added thereto until the slurry reached pH 6, and then the slurry was further subjected to solid-liquid separation using a 5C filter paper.

The $Cr_2O_3$-level of the final neutralized residue thus obtained was 2.4%. Since the solubility of $MgSO_4$ thus produced was high, the sulfur-level of the residue was 0.13%.

Comparative Example 2

The ore slurry of Example 2 was treated in the same manner as in Example 3, except that the ore slurry was introduced into an autoclave without treating the slurry with a hydrocyclone and a floatex density separator. The $Cr_2O_3$-level of the final neutralized residue thus obtained was 4.1%.

Since the solubility of $MgSO_4$ thus produced was high, the sulfur-level of the residue was 0.13%.

As is obvious from a comparison between Example 3 and Comparative Example 2, when an ore slurry was first classified with a hydrocyclone and then treated with a floatex density separator, which is one of specific gravity separation apparatuses, chromite in the ore slurry could be separated and removed, and the $Cr_2O_3$-level in the residue could be halved.

Comparative Example 3

A leach residue slurry 12 was produced in the same manner as in Example 3, a slaked lime slurry at a concentration of 25% by mass was added as a neutralizing agent to the entire amount of the leach residue slurry, and the slurry was neutralized to pH 8.5 at 60° C. Metal ions were precipitated as precipitate, and a neutralized residue and a treatment solution after neutralization were obtained by solid-liquid separation.

This neutralized residue was subjected to cyclone classification, and thus hematite 28 was separated.

A mixed liquid was prepared by mixing the remaining neutralized residue from which hematite 28 had been separated, with the treatment solution after neutralization, and a slaked lime slurry at a concentration of 25% by mass was added thereto. Thereafter, solid-liquid separation was repeated using a 5C filter paper, and thus a final neutralized residue was obtained.

The $Cr_2O_3$-level of the final neutralized residue thus obtained was 2.3%. Since the solubility of $CaSO_4$ thus produced was small, the sulfur-level of the residue was 5.72%, and the Ca-level was 8.49%.

INDUSTRIAL APPLICABILITY

As is obvious from the above results, the hydrometallurgical process for nickel oxide ore of the present invention is suitable as a smelting method based on high pressure leaching that is used in the field of wet smelting of nickel oxide ore.

REFERENCE SIGNS LIST

8 NICKEL OXIDE ORE
9 ORE SLURRY
10 LEACHED SLURRY
11 LEACHATE
12 LEACH RESIDUE SLURRY
14 MOTHER LIQUOR (1)
15 ZINC SULFIDE PRECIPITATE
16 MOTHER LIQUOR (2)
17 Ni—Co MIXED SULFIDES
18 BARREN LIQUOR
19 FINAL NEUTRALIZED RESIDUE
20 TAILING DAM
22 AUTOCLAVE-SUPPLIED SLURRY
23 CHROMITE
26 RESIDUE AFTER STEP (B-1)
27 TREATMENT SOLUTION AFTER STEP
28 HEMATITE

The invention claimed is:

1. A hydrometallurgical process for nickel oxide ore comprising:

forming an ore slurry from a nickel oxide ore;
a step (A) that includes recovering chromite particles from the ore slurry by specific gravity separation;
forming a leached slurry by autoclaving the ore slurry after step (A);
solid-liquid separating the leached slurry into a leachate and a leach residue slurry;
a step (B-1) that includes neutralizing the leachate by adding a neutralizing agent; the neutralizing agent including a magnesium-based neutralizing agent, and then separating the neutralized leachate into a residue after the step (B-1) and a mother liquor;
a step (B-2) that includes neutralizing the leach residue slurry by adding a neutralizing agent; the neutralizing agent including a magnesium-based neutralizing agent, and then separating hematite from the neutralized leach residue slurry; and then
a final neutralization step that includes adjusting the pH of the neutralized leach residue slurry from step (B-2) to about 8 to 9.

2. The hydrometallurgical process for nickel oxide ore according to claim 1, wherein the final neutralization step includes adding an alkali other than a magnesium-based neutralizing agent.

3. The hydrometallurgical process for nickel oxide ore according to claim 1, wherein the final neutralization step includes adjusting the pH of the neutralized residue slurry by adding calcium carbonate.

4. The hydrometallurgical process for nickel oxide ore according to claim 1, wherein step (B-1) the neutralizing agent includes a magnesium-based neutralizing agent and excludes a calcium based alkali.

5. The hydrometallurgical process for nickel oxide ore according to claim 1, wherein step (B-2) the neutralizing agent includes a magnesium-based neutralizing agent and excludes a calcium based alkali.

6. The hydrometallurgical process for nickel oxide ore according to claim 1, further comprising
a zinc removal step that includes blowing hydrogen sulfide into the mother liquor from step (B-1) and, therefrom, separating a zinc sulfide precipitate slurry and a zinc-removed mother liquor; and
a sulfurization step that includes blowing hydrogen sulfide into the zinc-removed mother liquor and, therefrom, separating a barren liquor and a mixed sulfide which contains nickel and cobalt; and wherein
the final neutralization step includes adjusting the pH of the neutralized leach residue slurry from step (B-2) and the barren liquor to about 8 to 9.

7. The hydrometallurgical process of claim 1, wherein a portion of the residue after the step (B-1) is recycled and admixed with the leached slurry; wherein the process comprises solid-liquid separating the admixture of the leaches slurry and the residue after the step (B-1).

8. The hydrometallurgical process for nickel oxide ore according to claim 1, wherein specific gravity separation includes cyclone classification.

9. The hydrometallurgical process for nickel oxide ore according to claim 8, wherein the recovery process of the step (A) performs cyclone classification without diluting the slurry concentration of the ore slurry.

10. The hydrometallurgical process for nickel oxide ore according to claim 9, wherein in the recovery process of the step (A), collection of chromite into an underflow in the cyclone classification is achieved in the entire amount except for unavoidable losses.

11. The hydrometallurgical process for nickel oxide ore according to claim 8, wherein the specific gravity separation further includes at least one step selected from the group consisting of: using a floatex density separator, using a spiral concentrator, and using a shaking table.

12. The hydrometallurgical process for nickel oxide ore according to claim 11, wherein a pulp content of a slurry supplied to the spiral concentrator is 15% to 35% solid by mass.

13. The hydrometallurgical process for nickel oxide ore according to claim 11, wherein an amount of teeter water supplied to the floatex density separator is 0.5 to 7.0 $m^3 \cdot h^{-1}/m^2$.

14. The hydrometallurgical process for nickel oxide ore according to claim 8, wherein after the specific gravity separation, the slurry is subjected to physical separation based on magnetic separation to remove magnetite, and non-magnetized materials are then recovered as a chromite concentrate.

15. The hydrometallurgical process for nickel oxide ore according to claim 1, wherein the process includes an ore processing step which includes removing foreign materials from the nickel oxide ore and adjusting a particle size prior to forming the ore slurry.

16. The hydrometallurgical process for nickel oxide ore according to claim 15, wherein the adjustment of the ore particle size is carried out by a screening treatment to a particle size of 2 mm or less.

17. The hydrometallurgical process for nickel oxide ore according to claim 1, wherein a level of chromium(III) oxide in the recovered chromite particles is 45% by mass or more.

18. The hydrometallurgical process for nickel oxide ore according to claim 1, wherein in the step (B-2), the pH after neutralization is 4 to 7.

19. The hydrometallurgical process for nickel oxide ore according to claim 1, wherein in the step (B-2), hematite is separated by cyclone classification.

20. The hydrometallurgical process for nickel oxide ore according to claim 11, wherein a pulp content of a slurry supplied to the spiral concentrator is 20% to 30% solid by mass.

* * * * *